Dec. 23, 1924.
E. M. BELL
1,520,320
DIFFERENTIAL MECHANISM
Filed May 24, 1923
2 Sheets-Sheet 1
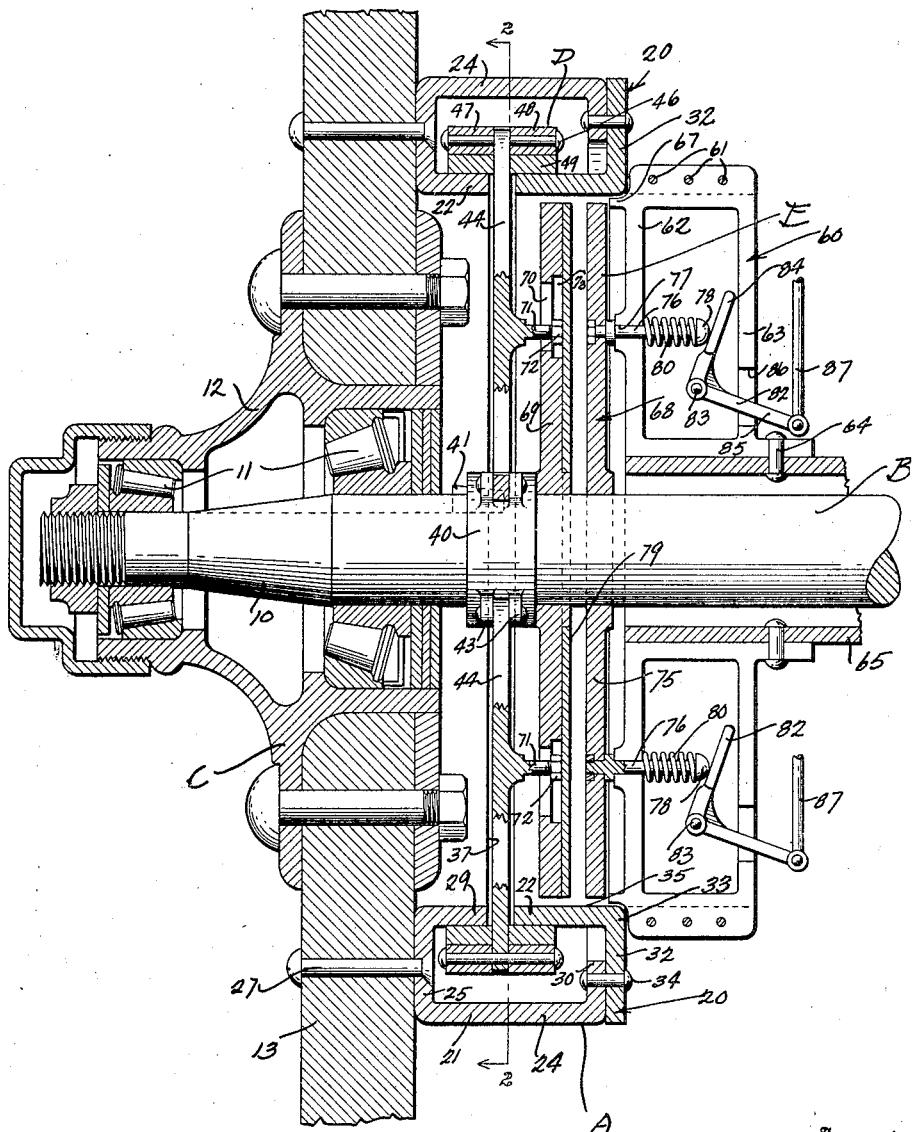
Inventor
Edward M. Bell Dec. 23, 1924.
E. M. BELL
1,520,320
DIFFERENTIAL MECHANISM
Filed May 24, 1923     2 Sheets-Sheet 2
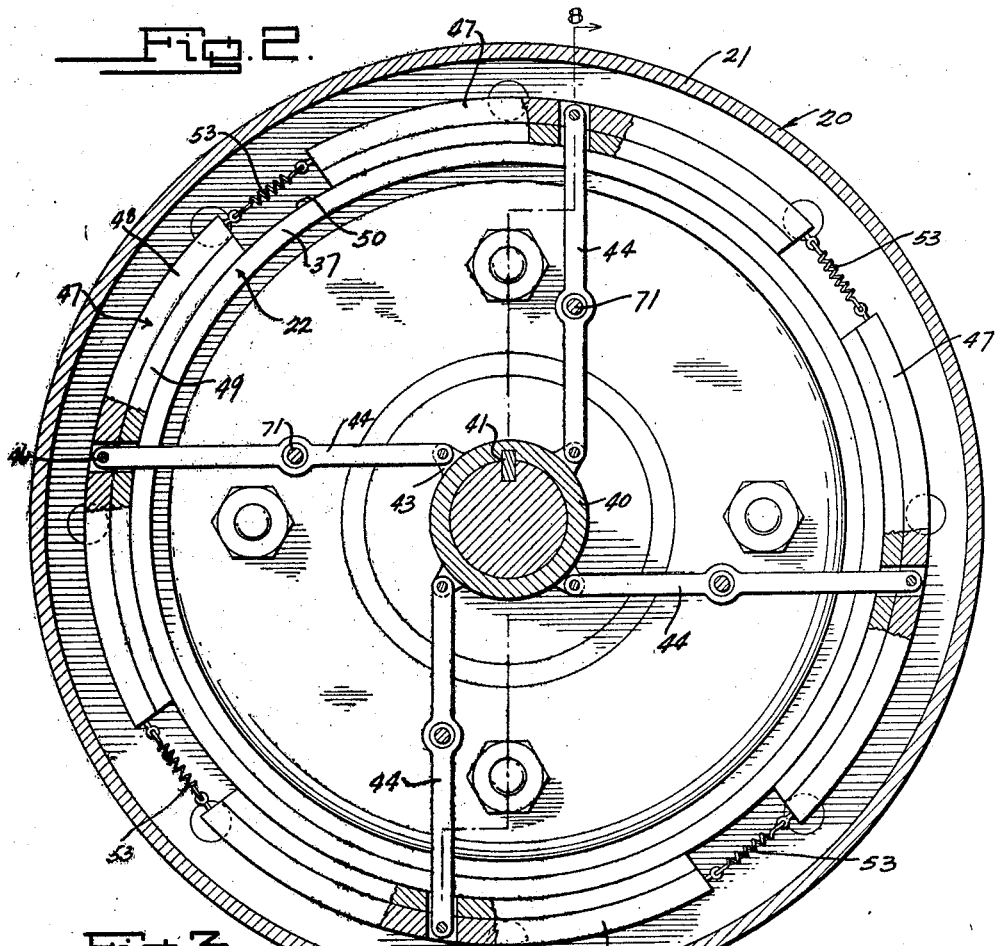
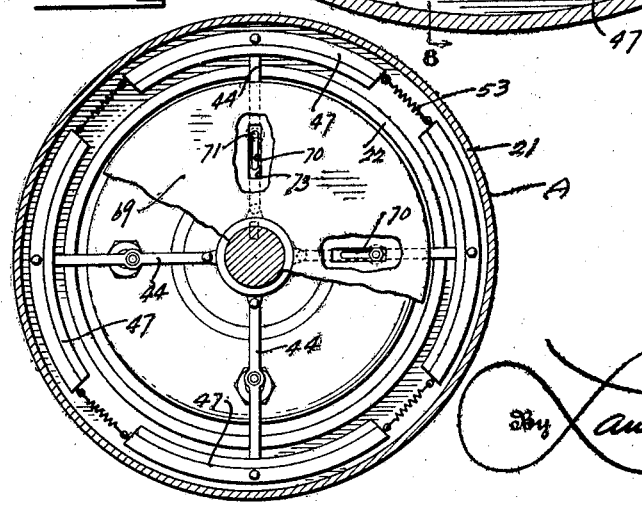
Inventor
Edward M. Bell Patented Dec. 23, 1924.

1,520,320

UNITED STATES PATENT OFFICE.

EDWARD M. BELL, OF MILL SPRING, NORTH CAROLINA.

DIFFERENTIAL MECHANISM.

Application filed May 24, 1923. Serial No. 641,217.

*To all whom it may concern:*

Be it known that I, EDWARD M. BELL, a citizen of the United States, residing at Mill Spring, in the county of Polk and State of North Carolina, have invented certain new and useful Improvements in Differential Mechanism, of which the following is a specification.

This invention relates to improvements in differential mechanisms.

The primary object of the invention is the provision of a novel type of differential mechanism, which may be used in connection with automobiles and other power driven vehicles, so that power from a drive member, such as a rear axle, may be effectively transmitted to driven members such as wheels rotatable upon the axle.

A further object of this invention is the provision of a differential mechanism embodying improved means whereby a driven member may be rotated in forward and reverse directions, the improved differential mechanism embodying certain novel features of the construction more specifically set forth in my copending application, Serial No. 558, 441, filed May 4, 1922.

A further object of this invention is the provision of a relatively simple and compact type of differential mechanism which may be mounted upon the traction wheels of automotive vehicles, operating upon the principle of a friction clutch, and including certain novel means whereby the differential mechanism may be regulated for forward or reverse directional drive of the wheels.

Other objects and advantages of this invention will be apparent during the course of the following detailed description.

In the accompanying drawings, forming a part of this specification, and wherein similar reference characters designate corresponding parts throughout the several views:

Figure 1 is a longitudinal sectional view, taken through the improved mechanism, showing certain novel details of its construction.

Figure 2 is a cross sectional view, taken substantially on the line 2—2 of Figure 1 of the drawings.

Figure 3 is a view somewhat analogous to the view illustrated in Figure 2, although showing different adjusted positions of details of the differential mechanism.

In the drawings, wherein for the purpose of illustration is shown the preferred form of this invention, the letter A may generally designate the differential mechanism adapted for association with the drive member B, such as an axle, for the transmission of power or traction to a driven member C, such as a vehicle wheel.

The improved differential mechanism A may include a clutch construction D as the main part of the differential mechanism A, and means E constituting shifting means for the clutch construction D.

Referring to the driven member C, in the case of a vehicle wheel, it is preferred to mount the same in any approved manner upon the spindle end 10 of the drive shaft or axle B, as by means of conventional thrust bearings 11 contained within a hub structure 12, as a part of the wheel C. The wheel C may be of the disc or spoke type, including a web 13 extending from the hub construction 12 to the felly (not shown), of the wheel, and upon which certain details of the improved differential mechanism A are mounted, as will be subsequently described.

Referring to the clutch construction D of the differential mechanism A, the same preferably includes a novel drum construction 20, of two sections connected to provide outer and inner annular flanges 21 and 22 respectively, concentrically arranged with respect to each other, and with respect to the drive member B when arranged upon the wheel C. One section 24 provides an inside flange 25 directly connected, as by rivets 27 to the web portion 13 of the vehicle wheel C, the outer annular flange 21, the outer side flange 30, and a portion 29 of the inner annular flange 22. The second part 33 is L-shaped in formation, including an outside flange 32 to be bolted to flange 30, as by rivets 34, and an annular flange portion 35 arranged flush with the annular flange portion 29 of the part 24. The portions 29 and 35 form the annular flange 22 above referred to, the facing edges of said portions 29 and 35 being properly spaced to provide a circumferential slot 37 about the inner annular flange 22.

A sleeve 40 is preferably keyed, as at 41, upon the drive member or shaft B and within the area of the drum 20, said sleeve 40 preferably having outstanding ears 43 thereon for pivotally receiving arms 44. Any number of the arms 44 may be provided, and they are of sufficient length to extend through the slot 37 of the inner annular flange 22 of the drum 20. At their outer end, each arm 44 is pivoted, as at 46 to a concavo-convex clutch shoe segment 47 intermediate its ends. The clutch shoe segments 47 each include a supporting portion 48 of metal or other rigid material, and an inner lining 49 facing the exterior surface 50 of the inner annular flange 22. The proximate ends of adjacent clutch shoes 47 are connected by means of springs 53, normally under tension so that the segments are urged toward the inner flange 22 of the drum 20. The segments 47 are thus arranged in ring like formation about the outer surface of the annular flange 22, and may, of course, move relative to said flange, as will be subsequently mentioned.

Referring to the shifting device, the same preferably includes a casing 60, which may be composed of two parts, connected as by rivets 61, and which provides an inner wall 62 and an outer wall 63. The casing 60 is stationary, being secured as by rivet means 64 to a stationary housing 65 of the axle or drive member B. The casing 60 is so positioned with respect to the drum 20 and at the open side of said drum, as to provide an annular lip 67, which extends into the compartment of the drum 20, at the inner surface of the inside annular flange 22, substantially as is illustrated in Figure 1 of the drawings.

A clutch device 68 is preferably provided as a portion of the shifting means E, which includes a disc or plate 69 mounted for oscillation upon the drive member B. The clutch device 68 is mounted within the drum 20, and the disc 69 is preferably disposed in facing relation adjacent the differential arms 44. Slots 70 are radially provided inwardly of the side of the disc 69 which faces the arms 44, for receiving stems 71 which are formed rigid upon the arms 44 substantially midway of the ends of the said arms and which project outwardly therefrom substantially at right angles. Nuts 72 are preferably adjustably supported upon the outer ends of the stems 71, adapted for sliding engagement in enlarged portions 73 of the slots 70, whereby the stems 71 may be attached in said slots of the disc 69 against liability of accidental disconnection. A plate 75, in the form of a disc, is provided as a part of the clutch 68, having detachable pins 76 connected thereto, and extending laterally of the plane of the disc 75 for slidable engagement through suitable openings 77 in the wall 62 of the casing 60. The disc 75 will thus be prevented from rotation or oscillation upon the shaft B, as it is connected to the stationary casing 60, although the pins 76 will permit longitudinal movement of said disc upon the drive member B, so that the same may have frictional contact with the disc lining 79, carried by the clutch disc 69. The slide pins 76 extend into the casing 60, intermediate the walls 62 and 63 thereof, and are provided with heads 78. Compression springs 80 are preferably provided upon each of the pins 76 engaging at the ends of each head 78 and the wall 62, to normally maintain the clutch disc 75 remote from its companion disc 69. Suitable bell crank levers 82 may be pivotally mounted, as at 83 in the casing 60 for each of the pins 76, having one portion 84 of each which engages the head 78 of the pin against which the same cooperates, and the second leg 85 of which extends through an opening 86 in the wall 63 of the casing 60. Suitable rods or like elements 87 may be pivotally connected, exteriorly of the casing 60, upon the legs 85 of the bell crank levers whereby upon operation of said rods the bell crank levers may be actuated for forcing the pins 76 inwardly, and likewise forcing the disc 75 into engagement with its companion disc 69 to produce a clutch effect of said discs, whereby the disc 69 which normally moves with the drive member B, will be held stationary for a brief period until the clutch segments thereof, and the arms which pivotally connect the same, will be shifted for a reverse driving movement from that which the same had previously assumed.

In operation, for forward driving of the wheel C, the arms 44 will be positioned substantially as is illustrated in Figure 2 of the drawings. In this position, the arms 44 are tangentially arranged with respect to the drive member B, so that the clutch shoes or segments 47 will be pulled into engagement with the drum flange 22. The springs 53, of course, cooperate in contracting the ring formed of the segmental shoes 47 about the drum flange 22. If it is desired to reverse the drive of the wheel C, it is necessary for the operator to first reverse the drive of the member or axle B, and throw the clutch discs 75 and 69 into engagement as above outlined. By such action, the disc 69 is held stationary and the stems 71 of the arms 44 are of course slidably pivoted to the stationary disc 69, so that the reverse drive of the shaft B may be immediately transmitted to the arms 44, rocking them upon the axes of their pins 71, so that the tangential inclination of the arms 44 will be properly changed. This rocking movement of course, again pulls the clutch shoes into engagement with the drum flange 22. As is illustrated in Figure 3, the arms 44 are shown in radial position, which denotes the manner in which the clutch shoes 47 and arms 44 are positioned during a shifting operation.

From the foregoing description of this invention, it is apparent that a differential mechanism has been provided, which is extremely simple in construction, and which is very compactly arranged. This form of invention utilizes a pulling action, so that the clutch shoes may engage the drum flange 22 with a maximum frictional engagement.

Various changes in the shape, size and arrangement of parts may be made to the form of the invention herein shown and described, without departing from the spirit of the invention or the scope of the claims.

I claim:

1. A device of the class described comprising a drive member, a driven member, a drum attached to the driven member including an annular flange having a slot circumferentially thereabout, clutch shoes of segmental formation disposed upon the outer surface of said annular flange of the drum, and arms pivotally connected to said shoes extending through the slot of said flange for pivotal connection to said drive member whereby upon operation of said drive member said arms will exert a pulling action upon said shoes so that the same will be forced into engagement with said drum for drive of said driven member.

2. A differential mechanism comprising a drive member, a driven member rotatable with respect to the drive member, a drum carried by said driven member of two part construction, each of said parts including an annular flange, said annular flanges lying in flush relation and spaced to provide a circumferential slot therebetween about said drum, segmental shoes carried about said annular flanges resting thereon over said circumferential slot, and means pivoted to the drive member and extending through the circumferential slot provided by said annular flanges for pivotal connection to the segmental shoes whereby upon operation of the drive member the last mentioned means will pull said shoes into engagement with the annular flanges of said two part drum for imparting rotation to the driven member.

3. A differential mechanism comprising a drive shaft, a wheel rotatable on the drive shaft, a drum connected to the wheel of two part construction providing annular flange portions lying flush with each other and providing a circumferential slot therebetween, segmental shoes, spring means connecting said segmental shoes so that the same are in contacting relation about the annular flange portions of said two part drum, and arms pivoted with respect to the drive member and extending thru the slot of said two part drum for pivotal connection to the segmental shoes.

4. A device of the class described comprising a drive member, a driven member rotatable on the drive member, an annular flange rigid with the driven member, segments about the exterior surface of the annular flange, arms pivoted with respect to the drive member and to said segments adapted upon operation of the drive member to pull said segments into engagement with the annular flange for rotation of the driven member, springs connecting the proximate ends of the segments normally tending to force said segments toward the annular flange, and means for rocking said arms at their pivotal connection with respect to the drive shaft whereby the differential mechanism may be positioned for reverse connection of the driven member with the drive member upon reverse drive of the latter.

5. A differential mechanism comprising a drive member, a wheel rotatable on the drive member, an annular flange rigid with the wheel, clutch shoes for the annular flange, means connecting the clutch shoes in pivotal manner to the drive member whereby upon rotation of the drive member the clutch shoes will be pulled into engagement with the annular flange for rotating the driven member, and a clutch device associated with said clutch shoes whereby they may be quickly shifted into power transmitting position upon reversing the drive of the drive member.

6. A differential mechanism comprising a drive shaft, a wheel rotatable on the drive shaft, a drum rigid with the wheel, segmental clutch shoes for the drum, relatively long arms pivotally connecting the segmental clutch shoes with the drive member, a clutch disc rotatable upon the drive member pivotally connected to said arms intermediate their ends, and means for clutching engagement with said disc to maintain the same stationary independent of rotation of said drive member whereby the arms may be rocked with the pivotal connection of the same with said disc as axes.

EDWARD M. BELL.